United States Patent
Sato et al.

(10) Patent No.: US 6,723,941 B2
(45) Date of Patent: Apr. 20, 2004

(54) WIRE ELECTRIC-DISCHARGE MACHINING APPARATUS

(75) Inventors: Tatsushi Sato, Tokyo (JP); Junichi Shibata, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/132,135

(22) Filed: Apr. 26, 2002

(65) Prior Publication Data

US 2003/0098293 A1 May 29, 2003

(30) Foreign Application Priority Data

Nov. 29, 2001 (JP) ........................ 2001-364998

(51) Int. Cl.⁷ ............... B23H 1/00; B23H 7/06
(52) U.S. Cl. .................................... 219/69.12
(58) Field of Search ...................... 219/69.12

(56) References Cited

U.S. PATENT DOCUMENTS 4,292,491 A * 9/1981 Tanaka et al. ............ 219/69.12
5,689,427 A * 11/1997 Li et al. ................... 219/69.12
5,756,956 A * 5/1998 Sato et al. ................ 219/69.12

FOREIGN PATENT DOCUMENTS

| JP | Show 60-034221 | 2/1985 |
| JP | Show 62-287922 | 12/1987 |
| JP | Hei - 01-097524 | 4/1989 |
| JP | Hei - 04-082618 | 3/1992 |
| JP | Hei - 08-155774 | 6/1996 |
| JP | JPA -3164964 | 3/2001 |

* cited by examiner

Primary Examiner—Geoffrey S. Evans
(74) Attorney, Agent, or Firm—Sughrue Mion, PLLC

(57) ABSTRACT

In the wire electric-discharge machining apparatus, when a measured voltage exceeds a proportional constant switching voltage that is set higher than a short circuit reference voltage, a relative feed rate determining unit outputs a relative feed rate based on a preliminarily set proportional constant A according to an increase in the measured voltage. When the measured voltage is equal to a reference voltage, the relative feed rate determining unit outputs a target feed rate that becomes a target value, and also outputs a relative feed rate that follows a preset proportional constant B (<A) and that is a positive value when the measured voltage exceeds the short circuit reference voltage but is below the proportional constant switching voltage.

15 Claims, 7 Drawing Sheets

WIRE ELECTRIC-DISCHARGE MACHINING APPARATUS

FIELD OF THE INVENTION

The present invention relates to a wire electric-discharge machining apparatus.

BACKGROUND OF THE INVENTION

FIG. 8 is a block diagram that shows a wire electric-discharge machining apparatus based on a conventional art of this type. In FIG. 8, reference numeral 1 denotes a wire electrode, 2 a workpiece, 3 a wire supplying unit, 4 a dielectric fluid supplying unit, 5 a machining power supply, 6 an average voltage measurement unit, 7 a control parameter setting unit, 8 a relative feed rate determining unit, 9 a control unit, and 10 a driving unit.

The wire supplying unit 3 feeds out the wire electrode 1 at an appropriate speed, and allows this to travel while giving an appropriate tension to the wire electrode 1. The dielectric fluid supplying unit 4 supplies a dielectric fluid in a minute gap between the wire electrode land the workpiece 2. The machining power supply 5 applies a pulse-like voltage between the wire electrode 1 and the workpiece 2 so that a discharge is generated between the wire electrode 1 and the workpiece 2. The average voltage measurement unit 6 measures an average voltage between the wire electrode 1 and the workpiece 2. The control parameter setting unit 7 sets a reference voltage and a target feed rate based on machining conditions set by the user. The relative feed rate determining unit 8 calculates a relative feed rate between the wire electrode 1 and the workpiece 2 by using the average voltage measured by the average voltage measurement unit 6 and the reference voltage and the target feed rate set by the control parameter setting unit 7 to supply the relative feed rate to the control unit 9. The control unit 9 relatively moves the wire electrode 1 and the workpiece 2 at the relative feed rate thus calculated through the driving unit 10.

The sequence of calculating the relative feed rate between the wire electrode 1 and the workpiece 2 in the relative feed rate determining unit 8 will be explained below.

First, the relative feed rate determining unit 8 compares the measured average voltage obtained by the average voltage measurement unit 6 with a preset short circuit reference voltage. The short circuit reference voltage is a voltage used as a reference when a case in which the measured average voltage is below this voltage is determined that the generation of a discharge is impossible because the wire electrode 1 and the workpiece 2 are in contact with each other. For example, when the wire electrode 1 is made of brass with the workpiece 2 being made of steel, the above-mentioned relative feed rate determining unit 8 generally sets the short circuit reference voltage to a value in the range of 10 to 15 V.

As a result of comparison between the measured average voltage and the short circuit reference voltage, when the measured average voltage goes below the short circuit reference voltage, the relative feed rate determining unit 8 sets the relative feed rate to a comparatively great negative value. Consequently, the wire electrode 1 and the workpiece 2 are separated from each other at a high speed, thereby making it possible to eliminate a short circuit state between them.

On the other hand, when the measured average voltage is not less than the short circuit reference voltage, the relative feed rate determining unit 8 sets the relative feed rate by executing the following calculations. In other words, the relative feed rate determining unit 8 divides the target feed rate given from the control parameter setting unit 7 by a difference between the reference voltage and the short circuit reference voltage to obtain a proportional constant. Next, the relative feed rate determining unit 8 calculates a difference (hereinafter, simply referred to as error voltage) between the measured average voltage and the reference voltage, multiplies this error voltage by the proportional constant, and obtains a value as a compensation feed rate. Lastly, the relative feed rate determining unit 8 adds the target feed rate to this compensation feed rate to decide a relative feed rate.

The relationship between the relative feed rate and the measured average voltage, obtained through the above-mentioned calculations, is collectively shown in the graph of FIG. 9. In other words, the relative feed rate is made to be proportional to the difference between the measured average voltage and the short circuit reference voltage, and the relative feed rate is set to be equal to the target feed rate when the measured average voltage is equal to the reference voltage.

However, the above-mentioned conventional art has a problem such that the value of the proportional constant is decided uniquely by the values of the target feed rate and the reference voltage. In other words, the proportional constant is a constant to determine the degree in which the relative feed rate is changed in response to variations in the measured average voltage, that is, the constant by which control gain is decided, so that this is the most basic and essential constant to define the machining control characteristic. Nevertheless, the constant is uniquely decided by the target feed rate and the reference voltage that are decided according to the settings of a machining plate thickness and the machining power supply 5, and therefore there is a problem that desired control characteristics cannot be set freely. Moreover, when the measured average voltage is not less than the short circuit reference voltage, the control gain becomes constant in all the areas. Therefore, if the response property is intended to be improved by increasing the proportional constant in the vicinity of the reference voltage in order to increase the machining speed, the amount of overshoot is inevitably increased as well. Thereby, the measured average voltage tends to easily go below the short circuit reference voltage in the vicinity of the short circuit reference voltage. As a result, the relative feed rate becomes frequently negative to repeat short circuit and opening, thus the machining state may become quite unstable.

In order to solve these problems, a modified technique has been proposed in which a voltage that makes the relative feed rate zero is set to be higher than the short circuit reference voltage. In this modified technique, the proportional constant is obtained not through calculation of the target feed rate and the reference voltage, but through multiplication of the error voltage by this proportional constant using the preset value to set a value as a compensation feed rate. Further, the target feed rate is added to this compensation feed rate to decide the relative feed rate. However, when the compensation feed rate is negative with its absolute value being greater than the target feed rate, the relative feed rate obtained through the calculations becomes negative, and in this case, zero is set as the relative feed rate. The reason why the relative feed rate is set to zero when the relative feed rate obtained through the calculations is negative, is explained as follows. When the relative feed rate is set negative, the wire electrode 1 backs up on the path. The wire electrode 1, which has once backed, again advances the same path, i.e., the path that has been once machined when a positive and relative feed rate is subsequently set. In this case, the side face of the workpiece 2 is machined, resulting in an excessively machined state. Therefore, the wire electrode 1 is allowed to back only when the backing is inevitably required, such as a case in which short circuit is occurring. In another cases, the wire electrode 1 is stopped to wait for the recovery of the state, which makes it possible to achieve far better machining quality even if the measured average voltage becomes low.

The relationship between the relative feed rate obtained through the above-mentioned modified technique and the measured average voltage is collectively shown in the graph of FIG. 10. In other words, in the range (a) of FIG. 10 in which the relative feed rate is positive, the relative feed rate is increased and decreased in proportion to the error voltage, and the relative feed rate is controlled to be equal to the target feed rate when the measured average voltage is equal to the reference voltage. In the range (b) of FIG. 10 in which the calculated relative feed rate is negative, the relative movement between the wire electrode 1 and the workpiece 2 is stopped. Moreover, when the measured average voltage goes below the short circuit reference voltage, the wire electrode 1 is allowed to back at a high speed from the workpiece 2.

The application of such a modified technique makes it possible to set the control gain independent from the target feed rate and reference voltage. Therefore, it becomes possible to control machining by setting appropriate proportional constants according to various machining conditions such as the setting of the machining power supply 5, the material and diameter of the wire electrode 1, the material and plate thickness of the workpiece 2 and the offset amount between the wire electrode 1 and workpiece 2. Moreover, since the relative feed rate becomes zero in the vicinity of the short circuit reference voltage, the measured average voltage hardly goes below the short circuit reference voltage, thereby making it possible to stabilize the machining state.

In the conventional modified technique, however, the machining volume at the time of finishing needs to be increased, and therefore a great amount of time is required for machining. This problem will be explained with reference to the figures as follows. FIG. 11 is a schematic diagram that shows how finishing machining is carried out in the wire discharge machining, FIG. 12 is a schematic diagram that shows a case in which there is waviness on the previously machined surface, and FIG. 13 is a schematic diagram that shows the profile of the machined surface after the finishing by applying the conventional modified technique to the previously machined surface with the waviness.

As shown in FIG. 11, in the wire discharge machining, the previously machined surface 100 having a greater surface roughness is subjected to finishing with smaller energy to form a currently machined surface 101 having a smaller surface roughness. Normally, great waviness, derived from various external disturbances, exists on the previously machined surface 100 having a greater surface roughness.

As shown in FIG. 12, even when the wire electrode 1 comes to a peak 100a of the waviness, the application of the conventional modified technique makes it possible to prevent the occurrence of short circuit since the relative feed rate abruptly drops to zero. However, since the machining with the wire electrode 1 being stopped progresses until the peak 100a of the waviness is removed, a recessed portion 101a tends to be formed at a portion corresponding to the rear side of the peak 100a of the waviness used to exist on the previously machined surface 100, on the currently machined surface 101 that is formed through the current finishing, as shown in FIG. 13.

Since the depth of the recessed portion 101a formed on the currently machined surface 101 is small in comparison with the height of the peak 100a that exists on the previously machined surface 100, it is certain that the degree of the machined surface roughness gradually reduces through the finishing machining. However, in the next finishing machining, it is necessary to carry out machining deeper than the recessed portion 101a, and therefore the machining volume for the depth from the currently machined surface 101 to the subsequently machined surface 102 becomes inevitably greater as shown in FIG. 13. Moreover, it is difficult to predict how deep the recessed portion 101a newly formed on the currently machined surface 101 will be with respect to the height of the peak 100a that used to exist on the previously machined surface 100. The machining volume performed in the next finishing machining, that is, the distance between the currently machined surface 101 and the subsequently machined surface 102 needs to be set with a greater margin. This also causes an increase in the machining volume.

After the finishing machining is performed, a reverse phenomenon as follows is generally experienced in the wire electric-discharge machining. Specifically, the reverse phenomenon in the machining volume is such that an insufficiently machined portion on the previously machined surface 100 is subjected to an excessive machining, while an excessively machined portion is subjected to an insufficient machining. In particular, as attempted in recent years, when the previously machined surface 100 having a great surface roughness is machined by using very small energy so that the number of finishing steps is minimized as small as possible to improve the total machining speed, the above-mentioned reverse phenomenon comes to appear more frequently, causing a great adverse effect on the machining speed.

Moreover, in the above-mentioned conventional modified technique, when the wire electrode 1 and the workpiece 2 are in contact with each other through machining dusts, the measured average voltage is not allowed to rise because a short circuit current actually flows through the machining dusts due to imperfect short circuit although the measured average voltage is not below the short circuit reference voltage. This case corresponds to the state in the range (b) shown in FIG. 10, in which the wire electrode 1 is being stopped and thereby the machining does not progress at all.

SUMMARY OF THE INVENTION

It is an object of this invention is to provide a wire electric-discharge machining apparatus capable of desirably setting a control gain so as to stabilize the machining state, and of improving the machining speed.

The wire electric-discharge machining apparatus according to one aspect of this invention comprises a relative feed rate determining unit that decides a relative feed rate between a wire electrode and a workpiece based on a measured voltage between the wire electrode and the workpiece. This wire electric-discharge machining apparatus carries out machining on the workpiece by generating a discharge between the wire electrode and the workpiece and relatively moving the wire electrode and the workpiece at the relative feed rate decided by the relative feed rate determining unit. The relative feed rate determining unit outputs a target feed rate as a target value when the measured voltage is equal to a preset reference voltage, and outputs a positive relative feed rate according to preset conditions, when the measured voltage exceeds a predetermined short circuit reference voltage but is below a switching voltage that is preliminarily set between the short circuit reference voltage and the reference voltage.

According to the above aspect, when the measured voltage is equal to the reference voltage, the wire electrode and the workpiece move at the target feed rate, and when the measured voltage exceeds the short circuit reference voltage, the wire electrode and the workpiece always move at the positive relative feed rate.

The wire electric-discharge machining apparatus according to another aspect of this invention comprises a relative feed rate determining unit that decides a relative feed rate between a wire electrode and a workpiece based on a measured voltage between the wire electrode and the workpiece. This wire electric-discharge machining apparatus carries out machining on the workpiece by generating a discharge between the wire electrode and the workpiece and relatively moving the wire electrode and the workpiece at the relative feed rate decided by the relative feed rate determining unit. When the measured voltage exceeds a predetermined short circuit reference voltage, the relative feed rate determining unit outputs a positive relative feed rate in which an amount of change per unit voltage change becomes smaller as a difference between the measured voltage and the short circuit reference voltage decreases.

According to the above aspect, when the measured voltage exceeds the short circuit reference voltage, the wire electrode and the workpiece always move at the positive relative feed rate in which an amount of change per unit voltage change becomes smaller as the difference between the measured voltage and the short circuit reference voltage decreases.

Other objects and features of this invention will become apparent from the following description with reference to the accompanying drawings.

DETAILED DESCRIPTIONS

Embodiments of the wire electric-discharge machining apparatus according to the present invention will be explained in detail below with reference to the accompanying drawings.

Figure 1:
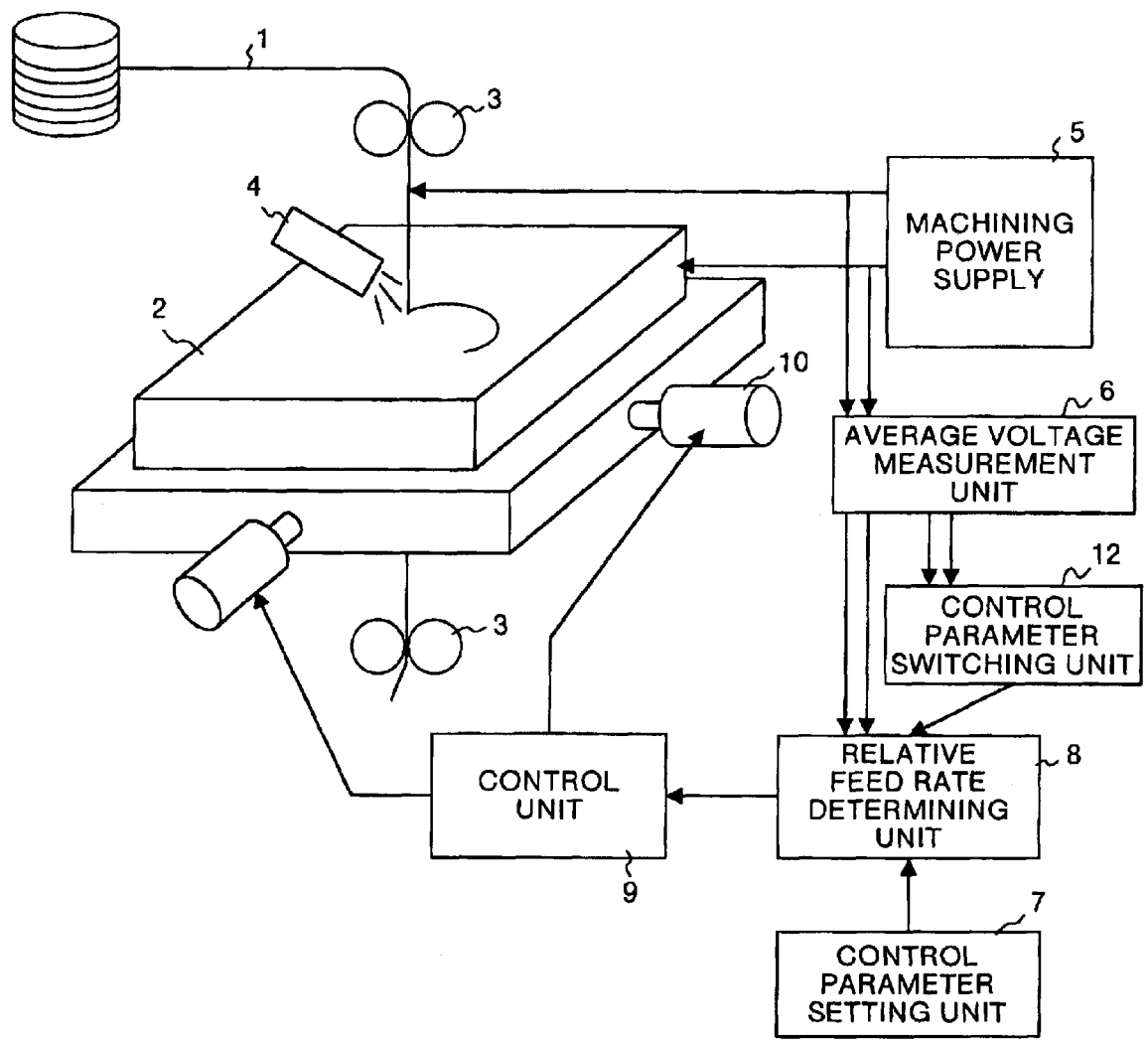
FIG. 1 is a diagram that shows a schematic construction of the wire electric-discharge machining apparatus according to the first embodiment of the present invention.
Figure 8:
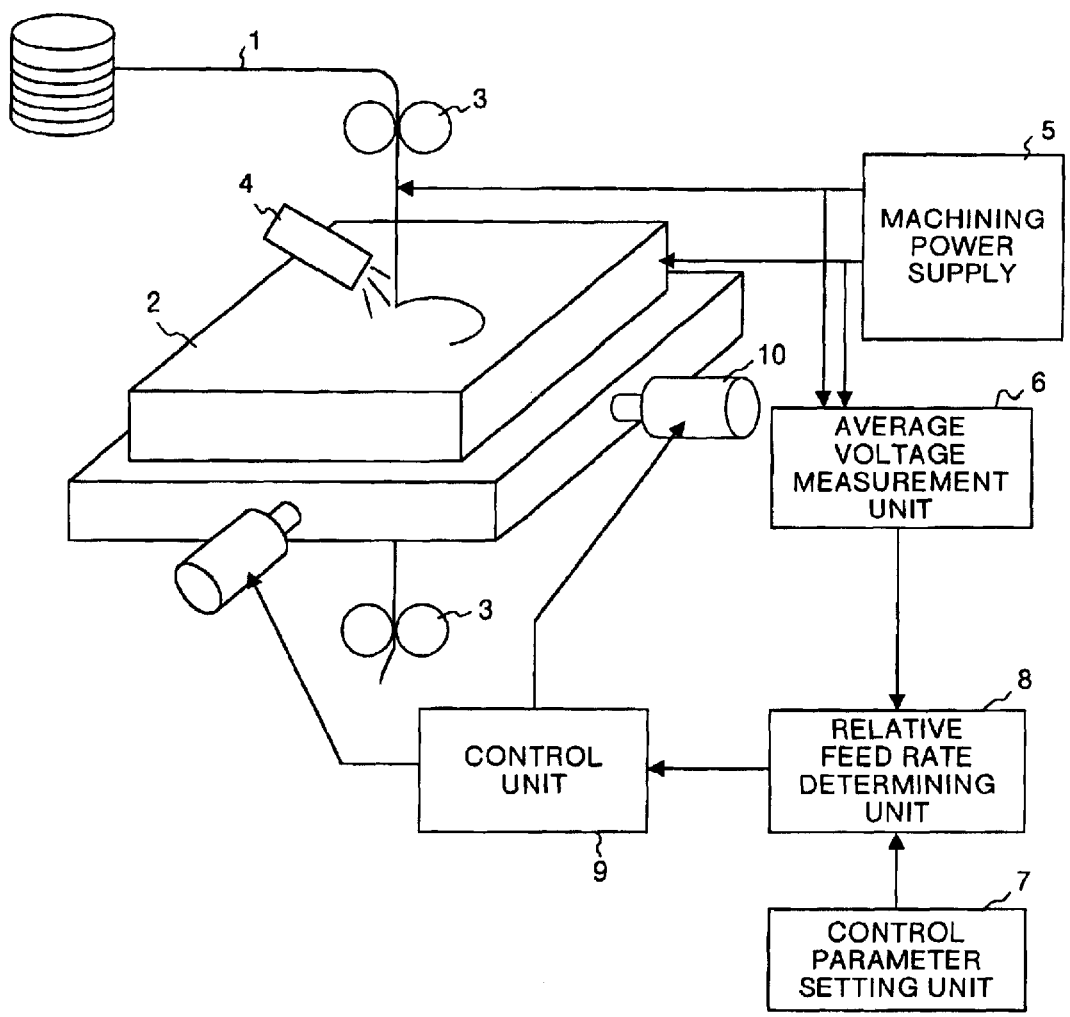
FIG. 8 is a diagram that schematically shows the construction of the conventional wire electric-discharge machining apparatus.
Figure 9:
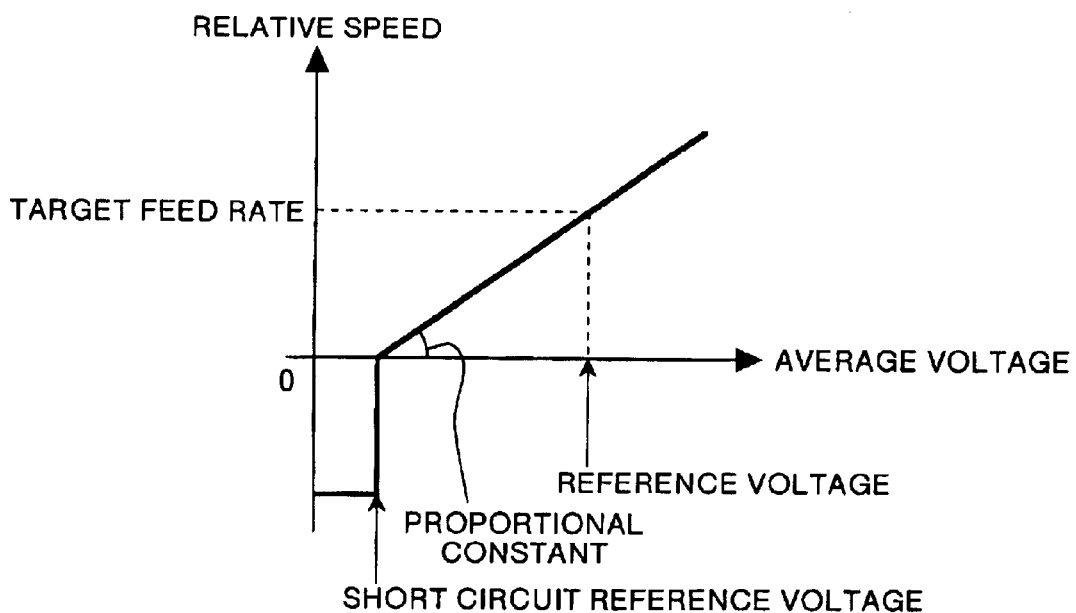
FIG. 9 is a graph that shows the relationship between the measured voltage and the relative feed rate in the conventional wire electric-discharge machining apparatus.
Figure 10:
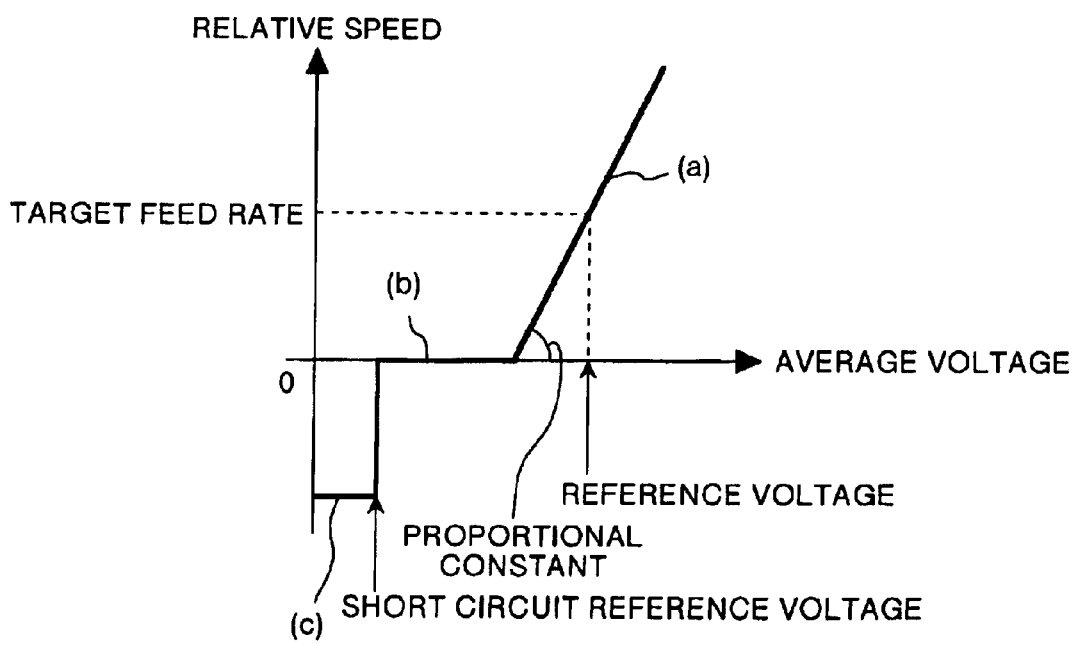
FIG. 10 is a graph that shows the relationship between the measured voltage and the relative feed rate in the conventional modified technique.
Figure 11:
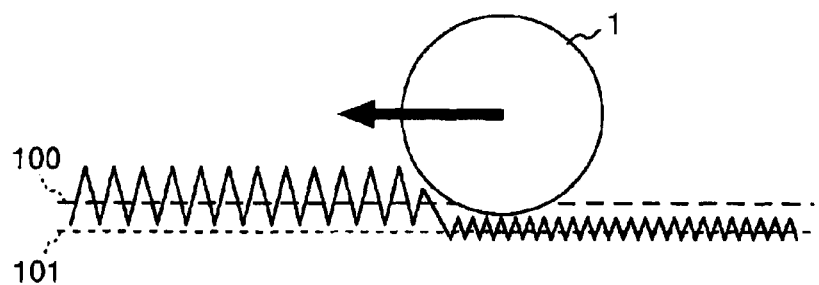
FIG. 11 is a schematic diagram that shows the sequence of processes in the finishing in the wire discharge machining.
Figure 12:
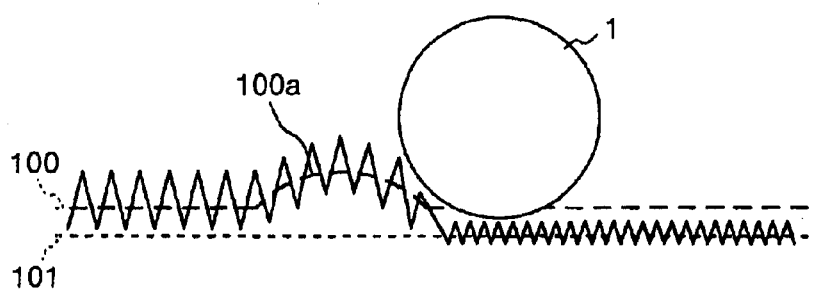
FIG. 12 is a schematic diagram that shows the case in which waviness exist on the previously machined surface.
Figure 13:
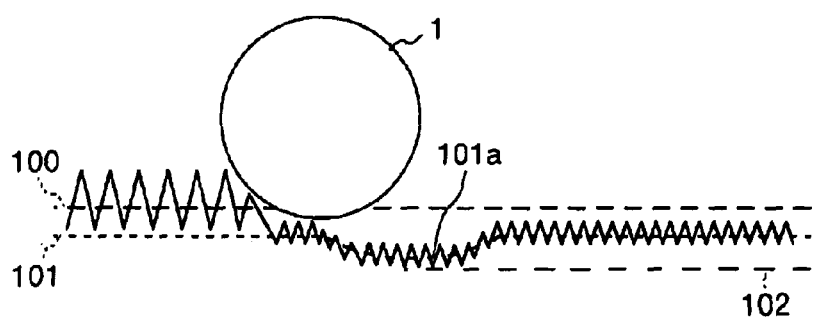
FIG. 13 is a schematic diagram that shows the profile of the machined surface after the finishing carried out by using the conventional modified technique on the previously machined surface with waviness.

A first embodiment of this invention will be explained below. FIG. 1 is a diagram that shows the construction of the wire electric-discharge machining apparatus according to the first embodiment of the present invention. As is the conventional device shown in FIG. 8, the wire electric-discharge machining apparatus shown here is provided with the following parts as main components, the wire supplying unit 3 which supplies the wire electrode 1, the dielectric fluid supplying unit 4 which supplies a dielectric fluid in a minute gap between the wire electrode 1 and the workpiece 2, the machining power supply 5 which applies a pulse-like voltage between the wire electrode 1 and the workpiece 2 to generate a discharge between the wire electrode 1 and the workpiece 2, the average voltage measurement unit 6 which measures an average voltage between the wire electrode 1 and the workpiece 2, the control parameter setting unit 7 which sets a reference voltage and a target feed rate based on machining conditions set by the user, the relative feed rate determining unit 8 which calculates a relative feed rate between the wire electrode 1 and the workpiece 2 based on the results of measurements by the average voltage measurement unit 6 and the contents of the settings in the control parameter setting unit 7, and the control unit 9 which relatively moves the wire electrode 1 and the workpiece 2 at the relative feed rate thus calculated through the driving unit 10. In addition to these components, this apparatus is further provided with a control parameter switching unit 12.

The featured parts of the wire electric-discharge machining apparatus will be explained below with emphasis on the control parameter switching unit 12.

First, the control parameter switching unit 12 calculates a control parameter (proportional constant) switching voltage as a switching voltage based on a control parameter (proportional constant) switching speed as a switching speed preliminarily set by the user. The control parameter (proportional constant) switching speed is a relative feed rate between the wire electrode 1 and the workpiece 2 that indicates a switching point of control parameters (proportional constant), and is set to a value lower than the target feed rate set by the control parameter setting unit 7. The control parameter switching voltage is a voltage between the wire electrode 1 and the workpiece 2 that corresponds to the switching speed of the control parameter (proportional constant), and is calculated as follows. For example, supposing that the target feed rate set by the control parameter setting unit 7 is Fr, the reference voltage is Vr, the set proportional constant prior to the switching of parameters is A, proportional constant switching speed as the switching point of the proportional constant is Fx, and the proportional constant switching voltage is Vx, the voltage is calculated by the following equation, Vx=Vr−(Fr−Fx)/A.

Moreover, the control parameter switching unit 12 carries out processing of preliminarily calculating the second proportional constant so that it becomes a control parameter (proportional constant) when the measured average voltage between the wire electrode 1 and the workpiece 2 is equal to the control parameter (proportional constant) switching voltage and that the relative feed rate becomes zero when the measured average voltage is equal to the short circuit reference voltage. For example, supposing that the second proportional constant is B (<A) and the short circuit reference voltage is Vs, the value is obtained by the following equation, B=Fx/(Vx−Vs). The short circuit reference voltage mentioned here is a reference voltage used to determine that, when the measured average voltage is below this reference voltage, the generation of a discharge is impossible due to contact between the wire electrode 1 and the workpiece 2, as is described in the section on the conventional art.

The control parameter (proportional constant) switching voltage and the second proportional constant have been set in the control parameter switching unit 12 in such a manner as explained above. The control parameter switching unit 12 switches the proportional constant of the relative feed rate determining unit 8 to the second proportional constant when the average voltage measured by the average voltage measurement unit 6 is not more than the control parameter (proportional constant) switching voltage, while it returns the proportional constant to the originally set proportional constant A when the measured average voltage exceeds the control parameter (proportional constant) switching voltage.

Consequently, the relative feed rate determining unit 8 decides a relative feed rate by using the set proportional constant A or the second proportional constant B that are switched by the control parameter switching unit 12 on demand. In other words, when the measured average voltage is smaller than the short circuit reference voltage as a result of comparison between the measured average voltage and the short circuit reference voltage, the relative feed rate determining unit 8 sets the relative feed rate to a comparatively great negative value. Accordingly, the wire electrode 1 and the workpiece 2 are separated from each other at a high speed, thereby making it possible to eliminate the short circuit state between them.

In contrast, when the measured average voltage exceeds the short circuit reference voltage but is below the proportional constant switching voltage, the relative feed rate determining unit 8 calculates a difference between the measured average voltage and the proportional constant switching voltage (hereinafter, referred to simply as a first error voltage), and this first error voltage is multiplied by the second proportional constant B to obtain a compensation feed rate. Lastly, the proportional constant switching speed is added to this compensation feed rate to decide the relative feed rate.

Moreover, when the measured average voltage exceeds the proportional constant switching voltage, the reference speed decision unit 8 calculates a difference between the measured average voltage and the reference voltage (hereinafter, referred to simply as a second error voltage), and this second error voltage is multiplied by the above-mentioned set proportional constant A to obtain a compensation feed rate. Lastly, the target feed rate is added to this compensation feed rate to decide the relative feed rate.

Figure 2:
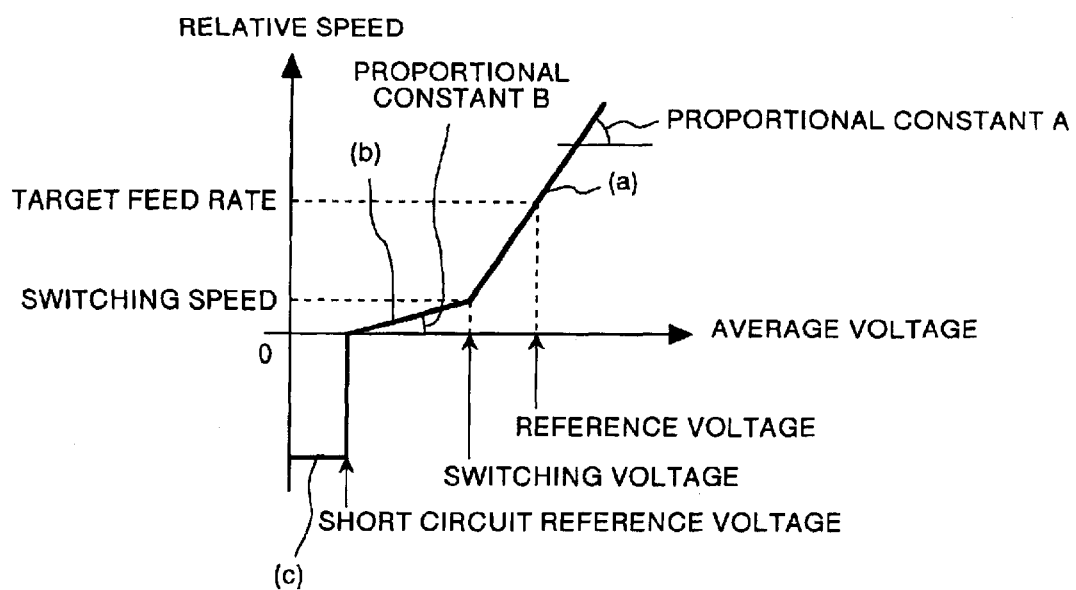
FIG. 2 is a graph that shows the relationship between the measured voltage and the relative feed rate in the wire electric-discharge machining apparatus according to the first embodiment.

The relationship between the measured average voltage and the reference moving speed, obtained by the relative feed rate determining unit 8, is shown in the graph of FIG. 2. In other words, in the range (a) of FIG. 2 in which the relative feed rate exceeds the proportional constant switching speed, the relative feed rate is increased or decreased in proportion to the second error voltage, and when the measured average voltage is equal to the reference voltage, the relative feed rate is set to be equal to the target feed rate. In the range (b) in which the relative feed rate is below the proportional constant switching speed, the relative feed rate is increased or decreased in proportion to the first error voltage. In the range (b) of FIG. 2, however, the amount of change in the relative feed rate per unit voltage change is smaller than the range (a) of FIG. 2. Moreover, when the measured average voltage is below the short circuit reference voltage, the wire electrode 1 is allowed to back at a high speed with respect to the workpiece 2.

According to such a wire electric-discharge machining apparatus, it is possible to arbitrarily set the proportional constants A and B, that is, control gains to be supplied to the driving unit 10, independent from the target feed rate and reference voltage. Therefore, it becomes possible to set appropriate proportional constants A and B according to various machining conditions, such as the settings of the machining power supply 5, the material and diameter of the wire electrode 1, the material and plate thickness of the workpiece 2, and the offset distance of the electrode path from the final surface of the workpiece. Moreover, when the measured average voltage has reached the short circuit reference voltage, the relative feed rate between the wire electrode 1 and the workpiece 2 becomes zero to eliminate the possibility of the measured average voltage going below the short circuit reference voltage. Thus, it becomes possible to stabilize the machining state.

Moreover, a positive relative feed rate is applied between the wire electrode 1 and the workpiece 2 at any time other than the occurrence of short circuit. Thus, even when the wire electrode 1 and the workpiece 2 are in contact with each other through machining dusts, the wire electrode 1 is not stopped, and therefore this invention is free from a problem in which the machining makes no progress.

Furthermore, according to the wire electric-discharge machining apparatus designed in such a manner that a positive relative feed rate is applied between the wire electrode 1 and the workpiece 2 at any time other than the occurrence of short circuit, the wire electrode 1 passes through a peak 100a of waviness prior to formation of a recessed portion in front of the peak 100a of the waviness existing on the previously machined surface 100. In this case, when the wire electrode 1 comes to the peak 100a of the waviness, the relative feed rate drops since the measured average voltage drops, and thereby the machining progresses in such a manner as to make the height of the peak 100a lower without causing any short circuit.

Figure 3:
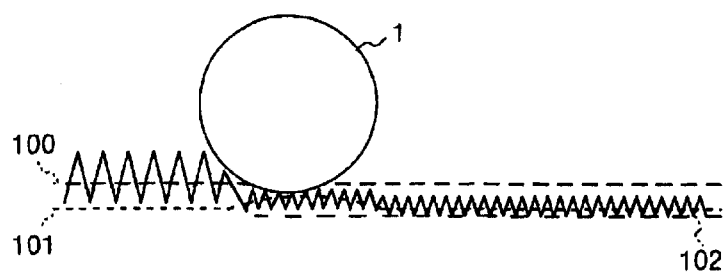
FIG. 3 is a schematic diagram that shows the profile of the machined surface after the finishing carried out by the wire electric-discharge machining apparatus according to the first embodiment when there is waviness on the previously machined surface.

FIG. 3 is a schematic diagram that shows the profile of the machined surface after a finishing has been carried out using the wire electric-discharge machining apparatus according to the first embodiment when the previously machined surface 100 has waviness. As shown in this figure, the application of the wire electric-discharge machining apparatus of the first embodiment makes it possible to effectively avoid the reverse phenomenon of the machining volume, thus, it becomes possible to reduce the machining volume required from the currently machined surface 101 to the subsequently machined face 102 so that the finishing volume is cut to a great degree, thereby making it possible to greatly improve the total machining speed. Moreover, since only the height of the peak 100*a* of the waviness is made lower and since no recessed portion is newly formed, it becomes possible to easily predict the height of the waviness after the machining. Accordingly, the prediction makes it possible to reduce a margin to be allowed in the machining amount of the next finishing and also decide the amount of the electrode offset in the finishing independent from the presence or absence of the waviness. These points are extremely effective in reducing the finishing volume.

Here, in the first embodiment, the relative feed rate corresponding to the measured average voltage between the short circuit reference voltage and the control parameter switching voltage is decided so as to be proportional to the difference between the control parameter switching voltage and the measured average voltage. This arrangement is beneficial in providing easier calculations when the control parameter switching voltage is reversely calculated from the control parameter switching speed. However, the present invention is not limited by this, and when the measured average voltage is equal to the control parameter switching voltage, the relative feed rate serves as the control parameter switching speed. When it is located between the control parameter switching voltage and the short circuit reference voltage, any function may be applied as a function which calculates the relative feed rate as long as the relative feed rate is positive. In this case, as shown in the first embodiment, it is preferable to use a function that makes the rate of increase in the relative feed rate with respect to the increase in the measured average voltage in the vicinity of the short circuit reference voltage smaller than the rate of increase in the relative feed rate with respect to the increase in the measured average voltage in the reference voltage. This arrangement is made because the relative feed rate becomes lower in the vicinity of the short circuit reference voltage and thereby it becomes possible to more positively prevent short circuit between the wire electrode 1 and the workpiece 2.

Figure 4:
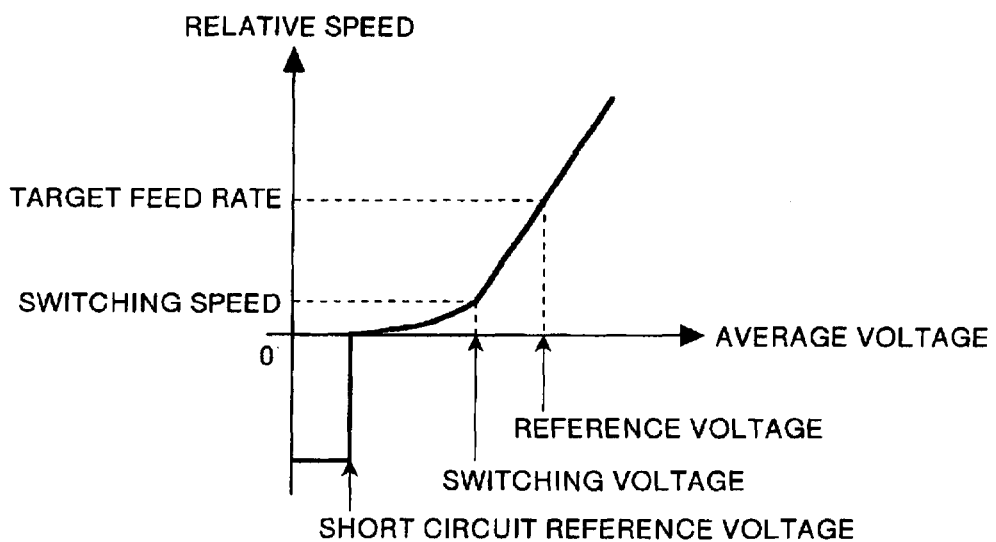
FIG. 4 is a graph that shows the relationship between the measured voltage and the relative feed rate in the wire electric-discharge machining apparatus according to the second embodiment of the present invention.

A second embodiment of this invention will be explained below. FIG. 4 is a graph that shows the relationship between the measured voltage and the relative feed rate in a wire electric-discharge machining apparatus according to the second embodiment. In this embodiment shown in FIG. 4, when the measured average voltage exceeds the short circuit reference voltage but is below the control parameter switching voltage, the relative feed rate with respect to the increase in the measured average voltage is allowed to have a relationship represented by a high-order function such as a quadratic function, etc., that is, a relationship in which the amount of change in the relative feed rate per unit voltage change is gradually decreased as the measured average voltage comes closer to the short circuit reference voltage. However, the above-mentioned high-order function is set so that when the measured average voltage becomes equal to the short circuit reference voltage, the relative feed rate becomes zero and when the measured average voltage becomes equal to the control parameter switching voltage, the relative feed rate is equal to the control parameter switching speed. Since the other arrangements are the same as those of the wire electric-discharge machining apparatus of the first embodiment, the explanation thereof is omitted.

In such a wire electric-discharge machining apparatus of the second embodiment also, it is possible to perform an appropriate machining control according to various machining conditions because the control gain to be applied to the driving unit 10 is set according to a desired high-order function independent from the target feed rate and reference voltage. Moreover, when the measured average voltage has reached the short circuit reference voltage, the relative feed rate between the wire electrode 1 and the workpiece 2 becomes zero, and therefore there is no possibility of the measured average voltage going below the short circuit reference voltage, thus, it becomes possible to stabilize the machining state.

Moreover, a positive relative feed rate is applied between the wire electrode 1 and the workpiece 2 at any time other than the occurrence of short circuit. Thus, even when the wire electrode 1 and the workpiece 2 are made in contact with each other through machining dusts, the wire electrode 1 is not stopped, and therefore this invention is free from a problem in which the machining makes no progress.

Furthermore, the wire electric-discharge machining apparatus is designed in such a manner that a positive relative feed rate is applied between the wire electrode 1 and the workpiece 2 at any time other than the occurrence of short circuit. Therefore, like in the first embodiment, it is possible to effectively avoid the reverse phenomenon in the machining volume, thus, it becomes possible to largely reduce the machining volume required from the currently machined surface 101 to the subsequently machined surface 102 so that the finishing volume is cut to a great degree, thereby making it possible to greatly improve the total machining speed. Moreover, since only the height of the peak 10*a* of the waviness is made lower and since no recessed portion is newly formed, it becomes possible to easily predict the height of the waviness after the machining. Therefore, it is possible to reduce a margin to be allowed in the machining amount of the next finishing and also to decide the amount of the electrode offset in the finishing independent from the presence or absence of waviness. Thus, these advantages are also extremely effective in reducing the finishing volume like in the first embodiment.

Moreover, in the wire electric-discharge machining apparatus according to the second embodiment, since the amount of change in the relative feed rate between the wire electrode and the workpiece is gradually reduced as the measured voltage comes closer to the short circuit reference voltage, it is possible to widen the low-gain control area in comparison with the first embodiment when the difference between the short circuit reference voltage and the control parameter switching voltage is the same. Thus, it is possible to positively prevent short circuit between the wire electrode 1 and the workpiece 2.

Figure 5:
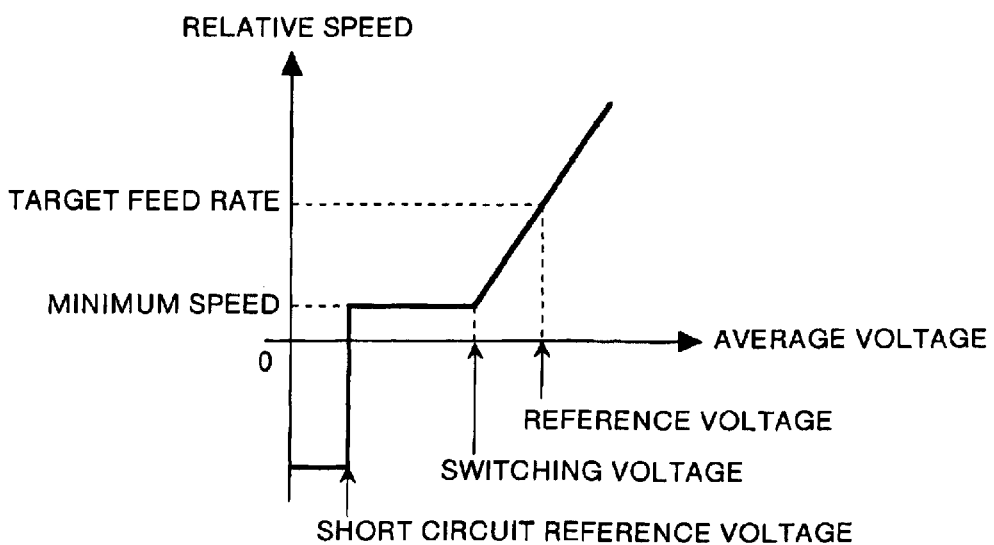
FIG. 5 is a graph that shows the relationship between the measured voltage and the relative feed rate in the wire electric-discharge machining apparatus according to the third embodiment of the present invention.

A third embodiment of this invention will be explained below. FIG. 5 is a graph that shows the relationship between the measured voltage and the relative feed rate in a wire electric-discharge machining apparatus according to the third embodiment. In this embodiment shown in FIG. 5, when the measured average voltage exceeds the short circuit reference voltage but is below the control parameter switching voltage, the device is allowed to output a constant relative feed rate independent from the increase of the measured average voltage. The constant relative feed rate may be set by multiplying the target feed rate by a predetermined ratio. In this case, the ratio is preferably set to approximately ⅒ or the like so that the relative feed rate is a minute value. The other arrangements are the same as those of the wire electric-discharge machining apparatus shown in the first embodiment, and therefore the respective explanations are omitted.

In such a wire electric-discharge machining apparatus of the third embodiment also, the control gain to be supplied to the driving unit 10 is desirably set independent from the target feed rate and the reference voltage. Therefore, it is possible to carry out an appropriate machining control according to various machining conditions. Moreover, when the measured average voltage has reached the short circuit reference voltage, the relative feed rate between the wire electrode 1 and the workpiece 2 becomes zero to eliminate the possibility of measured average voltage going below the short circuit reference voltage. Thus, it becomes possible to stabilize the machining state.

Moreover, a positive relative feed rate is applied between the wire electrode 1 and the workpiece 2 at any time other than the occurrence of short circuit. Thus, even when the wire electrode 1 and the workpiece 2 are made in contact with each other through machining dusts, the wire electrode 1 is not stopped, and therefore this invention is free from a problem in which the machining makes no progress.

Furthermore, the wire electric-discharge machining apparatus is designed in such a manner that a positive relative feed rate is applied between the wire electrode 1 and the workpiece 2 at any time other than the occurrence of short circuit. Therefore, like in the first embodiment, it is possible to effectively avoid the reverse phenomenon in the machining volume. Thus, it becomes possible to reduce the machining volume required from the currently machined surface 101 to the subsequently machined face 102 so that the finishing volume is cut to a great degree, thereby making it possible to greatly improve the total machining speed. Moreover, since only the height of the peak 100a of the waviness is made lower and since no recessed portion is newly formed, it becomes possible to easily predict the height of the waviness after the machining, and it is possible to reduce a margin to be allowed in the machining amount of the next finishing and also to decide the amount of the electrode offset in the finishing independent from the presence or absence of waviness. Thus, these advantages a real so extremely effective in reducing the finishing volume like in the first embodiment.

In the wire electric-discharge machining apparatus according to the third embodiment, when the measured voltage exceeds the short circuit reference voltage but is below the switching voltage, the wire electrode 1 and the workpiece 2 move at a constant moving speed, and thereby the relative feed rate between the wire electrode 1 and the workpiece 2 can be calculated more easily.

Figure 6:
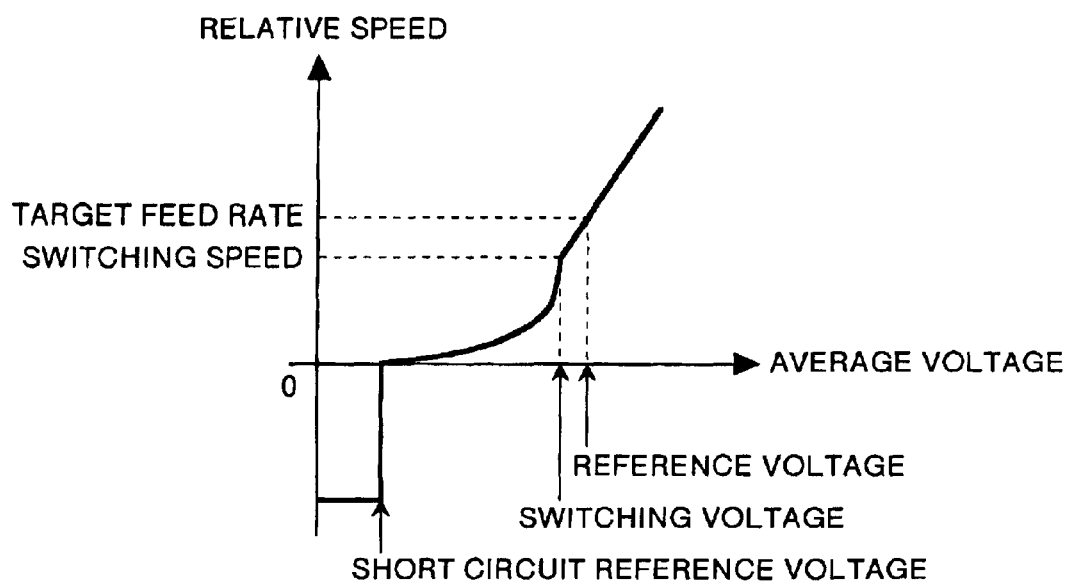
FIG. 6 is a graph that shows the relationship between the measured voltage and the relative feed rate in the wire electric-discharge machining apparatus according to the fourth embodiment of the present invention.

A fourth embodiment of this invention will be explained below. FIG. 6 is a graph that shows the relationship between the measured voltage and the relative feed rate in a wire electric-discharge machining apparatus according to the fourth embodiment. In this fourth embodiment shown in FIG. 6, when the measured average voltage exceeds the short circuit reference voltage but is below the control parameter switching voltage as a switching voltage, the relative feed rate with respect to the increase in the measured average voltage is allowed to have a relationship represented by a high-order function such as a quadratic function, etc. That is, the amount of change in the relative feed rate per unit voltage change is gradually increased as the measured average voltage comes closer to the short circuit reference voltage. And a relative feed rate having an amount of change per unit voltage change that is greater than the case in which the measured voltage exceeds the control parameter switching voltage is output, immediately before the measured voltage has reached the control parameter switching voltage. However, in the same manner as the third embodiment, the above-mentioned high-order function is set so that the relative feed rate is set to zero when the measured average voltage becomes equal to the short circuit reference voltage, and the relative feed rate is equal to the control parameter switching speed when the measured average voltage becomes equal to the control parameter switching voltage. Since the other arrangements are the same as those of the wire electric-discharge machining apparatus of the first embodiment, the explanation thereof is omitted.

In such a wire electric-discharge machining apparatus of the fourth embodiment also, the control gain to be applied to the driving unit 10 can be set according to a desired high-order function independent from the target feed rate and reference voltage. Therefore, it is possible to carry out an appropriate machining control according to various machining conditions. Moreover, when the measured average voltage has reached the short circuit reference voltage, the relative feed rate between the wire electrode 1 and the workpiece 2 becomes zero. Therefore, there is no possibility of the measured average voltage going below the short circuit reference voltage, thus, it becomes possible to stabilize the machining state.

Moreover, a positive relative feed rate is applied between the wire electrode 1 and the workpiece 2 at any time other than the occurrence of short circuit. Thus, even when the wire electrode 1 and the workpiece 2 are made in contact with each other through machining dusts, the wire electrode 1 is not stopped, and therefore this invention is free from a problem in which the machining makes no progress.

Furthermore, the wire electric-discharge machining apparatus is designed in such a manner that a positive relative feed rate is applied between the wire electrode 1 and the workpiece 2 at any time other than the occurrence of short circuit. Therefore, like in the first embodiment, it is possible to effectively avoid the reverse phenomenon in the machining volume, thus, it becomes possible to reduce the machining volume required from the currently machined surface 101 to the subsequently machined face 102 so that the finishing volume is cut to a great degree, thereby making it possible to greatly improve the total machining speed. Moreover, since only the height of the peak 100a of the waviness is made lower and since no recessed portion is newly formed, it becomes possible to easily predict the height of the waviness after the machining. It is therefore possible to reduce a margin to be allowed in the machining amount of the next finishing and also to decide the amount of the electrode offset in the finishing independent from the presence or absence of waviness. Thus, these advantages are also extremely effective in reducing the finishing volume like in the first embodiment.

Moreover, in the wire electric-discharge machining apparatus according to the fourth embodiment, since the relative feed rate between the wire electrode 1 and the workpiece 2 abruptly drops when the measured voltage goes slightly below the control parameter switching voltage, it is possible to further widen the low-gain control area in comparison with the second embodiment. Thus, it is possible to positively prevent short circuit between the wire electrode 1 and the workpiece 2.

Figure 7:
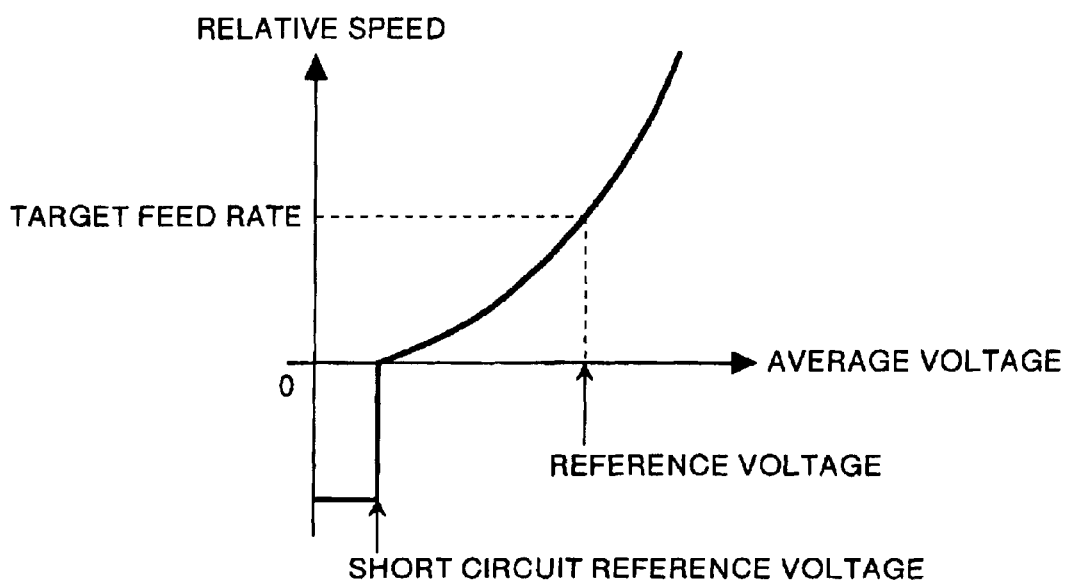
FIG. 7 is a graph that shows the relationship between the measured voltage and the relative feed rate in the wire electric-discharge machining apparatus according to the fifth embodiment of the present invention.

A fifth embodiment of this invention will be explained below. FIG. 7 is a graph that shows the relationship between the measured voltage and the relative feed rate in a wire electric-discharge machining apparatus according to the fifth embodiment. In any of the aforementioned embodiments 1 to 4, when the measured voltage is not less than the reference voltage, the increase in the relative feed rate is made proportional to the increase in the measured average voltage. However, in this case, the present invention does not necessarily require such a proportional relationship. Therefore, in the fifth embodiment shown in FIG. 7, when the measured average voltage is not less than the short circuit reference voltage, the device is allowed to use a single high-order function that increases the degree of an increase in the relative feed rate with respect to the increase in the measured average voltage as a difference from the corresponding short circuit reference voltage increases. However, the above-mentioned high-order function is set so that the relative feed rate becomes zero when the measured average voltage becomes equal to the short circuit reference voltage, and the relative feed rate is equal to the target feed rate when the measured average voltage becomes equal to the reference voltage. Since the other arrangements are the same as those of the wire electric-discharge machining apparatus of the first embodiment, the explanation thereof is omitted.

In such a wire electric-discharge machining apparatus of the fifth embodiment also, since the control gain to be applied to the driving unit 10 is set according to a desired high-order function independent from the target feed rate and reference voltage, it is possible to carry out an appropriate machining control according to various machining conditions. Moreover, when the measured average voltage has reached the short circuit reference voltage, the relative feed rate between the wire electrode 1 and the workpiece 2 becomes zero. Therefore, there is no possibility of the measured average voltage going below the short circuit reference voltage, thus, it becomes possible to stabilize the machining state.

Moreover, a positive relative feed rate is applied between the wire electrode 1 and the workpiece 2 at any time other than the occurrence of short circuit. Thus, even when the wire electrode 1 and the workpiece 2 are made in contact with each other through machining dusts, the wire electrode 1 is not stopped, and therefore this invention is free from a problem in which the machining makes no progress.

Furthermore, the wire electric-discharge machining apparatus is designed in such a manner that a positive relative feed rate is applied between the wire electrode 1 and the workpiece 2 at any time other than the occurrence of short circuit. Therefore, like in the first embodiment, it is possible to effectively avoid the reverse phenomenon in the machining volume. Thus, it becomes possible to reduce the machining volume required from the currently machined surface 101 to the subsequently machined surface 102 so that the finishing volume is cut to a great degree, thereby making it possible to greatly improve the total machining speed. Moreover, since only the height of the peak 100a of the waviness is made lower and since no recessed portion is newly formed, it becomes possible to easily predict the height of the waviness after the machining. It is therefore possible to reduce a margin to be allowed in the machining amount of the next finishing and also to decide the amount of the electrode offset in the finishing independent from the presence or absence of the waviness. Thus, these advantages are extremely effective in reducing the finishing volume like in the first embodiment.

Additionally, in any of the above-mentioned embodiments 1 to 5, it is not necessary to calculate the relative feed rates each time according to the measured average voltage and to supply these to the respective control unit 9. A table, which is formed according to the relationship between the measured average voltage and the relative feed rate shown in FIGS. 2, 4, 5, 6 or 7, may be preliminarily stored, and the relative feed rate may be obtained from the measured average voltage by using this table during the actual machining.

Moreover, in any of the above-mentioned embodiments 1 to 5, no explanation has been particularly given to the upper limit of the relative feed rate. However, the relative feed rate may of course be controlled by using a high-speed area that is not normally used, such as an area making the speed not less than 50 mm per minute, in order to maintain a predetermined machining precision by suppressing vibration in the wire electric-discharge machining apparatus or the like. Even when the increase in the relative feed rate is set to zero in the high-speed area, the functions and effects described in the respective embodiments are of course obtained sufficiently.

As explained above, according to one aspect of this invention, when the measured voltage and the reference voltage are equal to each other, the wire electrode and the workpiece move at the target feed rate, and when the measured voltage exceeds the short circuit reference voltage, the wire electrode and the workpiece always move at a positive relative feed rate. Therefore, it is possible to desirably set the control gain in a range exceeding at least the switching voltage, and consequently to stabilize the machining state. Moreover, the positive relative feed rate is always outputted when the measured voltage exceeds the short circuit reference voltage. Therefore, for example, even when the wire electrode comes across a peak of waviness on the workpiece, it is allowed to pass through the peak without causing a short circuit state. Thus, it is possible to carry out a finishing by avoiding the reverse phenomenon in the machining volume such as a formation of a recessed portion in the rear side of the peak. Consequently, it becomes possible to greatly reduce the finishing volume and to improve the machining speed. Furthermore, even when the wire electrode and the workpiece are made in contact with each other through machining dusts, the relative movement between the wire electrode and the workpiece is not stopped, and therefore this invention is free from a problem in which the machining makes no progress.

Moreover, when the measured voltage exceeds a predetermined short circuit reference voltage but is below the switching voltage, the wire electrode and the workpiece move at the positive relative feed rate lower than the target feed rate. Therefore, it becomes possible to prevent short circuit between the wire electrode and the workpiece.

Furthermore, the relative feed rate between the wire electrode and the workpiece becomes lower as the measured voltage comes closer to the short circuit reference voltage. Therefore, it becomes possible to minimize the relative feed rate in the vicinity of the short circuit reference voltage, and consequently to prevent short circuit between the wire electrode and the workpiece.

Moreover, the amount of change in the relative feed rate between the wire electrode and the workpiece is gradually reduced as the measured voltage comes closer to the short circuit reference voltage. Therefore, it becomes possible to widen the low-gain control area, and consequently to prevent short circuit between the wire electrode and the workpiece.

Furthermore, when the measured voltage exceeds the short circuit reference voltage but is below the switching voltage, the wire electrode and the workpiece move at the relative feed rate having a smaller amount of change per unit voltage change than the case in which the measured voltage exceeds the switching voltage. Therefore, it becomes possible to minimize the relative feed rate in the vicinity of the short circuit reference voltage, and consequently to prevent short circuit between the wire electrode and the workpiece.

Moreover, when the measured voltage goes slightly below the switching voltage, the relative feed rate between the wire electrode and the workpiece abruptly drops. Therefore, it becomes possible to widen the low-gain control area, and consequently to prevent short circuit between the wire electrode and the workpiece.

Furthermore, when the measured voltage exceeds the short circuit reference voltage but is below the switching voltage, the wire electrode and the workpiece move at a constant relative speed. Therefore, the relative feed rate between the wire electrode and the workpiece can be calculated more easily.

Moreover, by preliminarily set a ratio to be multiplied, it is possible to automatically decide the relative feed rate between the wire electrode and the workpiece. Therefore, it is not necessary to set the relative feed rate at each operation, thereby making it possible to provide a better operability.

Furthermore, since it is possible to calculate the switching voltage based on the switching speed, it is not necessary to set the switching voltage, thereby making it possible to provide a better operability.

According to another aspect of this invention, when the measured voltage exceeds the short circuit reference voltage, the wire electrode and the workpiece always move at a positive relative feed rate which has an amount of change per unit voltage change that becomes smaller as the difference between the measured voltage and the short circuit reference voltage decreases. Therefore, it is possible to desirably set the control gain independent from the given target feed rate and reference voltage, and consequently to stabilize the machining state. Moreover, the positive reference moving speed is always outputted when the measured voltage exceeds the short circuit reference voltage. Therefore, for example, even when the wire electrode comes across a peak of waviness on the workpiece, it is allowed to pass through the peak without causing a short circuit state. Thus, it is possible to carry out a finishing by avoiding the reverse phenomenon in the machining volume such as a formation of a recessed portion in the rear side of the peak. Consequently, it becomes possible to greatly reduce the finishing volume and to improve the machining speed. Furthermore, even when the wire electrode and the workpiece are made in contact with each other through machining dusts, the relative movement between the wire electrode and the workpiece is not stopped, and therefore this invention is free from a problem in which the machining makes no progress.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A wire electric-discharge machining apparatus which comprises:
   a relative feed rate determining unit that decides a relative feed rate between a wire electrode and a workpiece based on a measured voltage between the wire electrode and the workpiece, and which carries out machining on the workpiece by generating a discharge between the wire electrode and the workpiece and relatively moving the wire electrode and the workpiece at the relative feed rate decided by the relative feed rate determining unit,
   wherein the relative feed rate determining unit outputs an target feed rate as a target value when the measured voltage is equal to a preset reference voltage, and outputs a positive relative feed rate according to preset conditions, when the measured voltage exceeds a predetermined short circuit reference voltage but is below a switching voltage that is preliminarily set between the short circuit reference voltage and the reference voltage.

2. The wire electric-discharge machining apparatus according to claim 1, wherein the relative feed rate determining unit outputs a relative feed rate that is lower than the target feed rate, when the measured voltage exceeds the short circuit reference voltage but is below the switching voltage.

3. The wire electric-discharge machining apparatus according to claim 1, wherein the relative feed rate determining unit outputs a relative feed rate that increases monotonically in proportion to the increase in the measured voltage, when the measured voltage exceeds the short circuit reference voltage but is below the switching voltage.

4. The wire electric-discharge machining apparatus according to claim 3, wherein the relative feed rate determining unit gradually reduces the amount of change in the relative feed rate per unit voltage change as the measured voltage comes closer to the short circuit reference voltage.

5. The wire electric-discharge machining apparatus according to claim 3, wherein the relative feed rate determining unit outputs a relative feed rate having a smaller amount of change in the relative feed rate per unit voltage change than the case in which the measured voltage exceeds the switching voltage, when the measured voltage exceeds the short circuit reference voltage but is below the switching voltage.

6. The wire electric-discharge machining apparatus according to claim 3, wherein the relative feed rate determining unit gradually increases the amount of change in the relative feed rate per unit voltage change as the measured voltage comes closer to the switching voltage, and outputs a relative feed rate having a greater amount of change per unit voltage than the case in which the measured voltage exceeds the switching voltage, immediately before the measured voltage reaches the switching voltage.

7. The wire electric-discharge machining apparatus according to claim 1, wherein the relative feed rate determining unit outputs a constant relative feed rate when the measured voltage exceeds the short circuit reference voltage but is below the switching voltage.

8. The wire electric-discharge machining apparatus according to claim 7, wherein the constant relative feed rate is decided by multiplying a predetermined target feed rate by a preset ratio.

9. The wire electric-discharge machining apparatus according to claim 1, wherein the relative feed rate determining unit sets a switching speed having a value lower than the predetermined target feed rate, and calculates the switching voltage by using the relationship between the measured voltage and the relative feed rate based on the switching speed.

10. A wire electric-discharge machining apparatus according to claim 1, further comprising a control parameter switching unit which sets a reference voltage and a target feed rate based on predetermined machining conditions.

11. A wire-electric discharge machining apparatus according to claim 1, wherein said short circuit reference voltage is a preset voltage which determines whether the generation of the discharge is impossible due to contact between the wire electrode and the work piece.

12. A wire electric-discharge machining apparatus which comprises:

a relative feed rate determining unit that decides a relative feed rate between a wire electrode and a workpiece based on a measured voltage between the wire electrode and the workpiece, and which carries out machining on the workpiece by generating a discharge between the wire electrode and the workpiece and relatively moving the wire electrode and the workpiece at the relative feed rate decided by the relative feed rate determining unit, wherein when the measured voltage exceeds a predetermined short circuit reference voltage, the relative feed rate determining unit outputs a positive relative feed rate in which an amount of change per unit voltage change becomes smaller as a difference between the measured voltage and the short circuit reference voltage decreases.

13. A wire electric-discharge machining apparatus comprising:

a machining power supply which applies a pulse-like voltage between a wire electrode and a workpiece;

an average voltage measurement unit which measures an average voltage between the wire electrode and the workpiece;

a control parameter switching unit which sets a reference voltage and a target feed rate based on predetermined machining conditions;

a relative feed rate determining unit which decides a relative feed rate between the wire electrode and the workpiece based on a measured voltage between the wire electrode and the workpiece, and which carries out machining on the workpiece by generating a discharge between the wire electrode and the workpiece and relatively moving the wire electrode and the workpiece at the relative feed rate decided by the relative feed rate determining unit;

a control parameter setting unit which sets a reference voltage and a target feed rate based on predetermined conditions; and a control unit which moves the wire electrode and the workpiece by a feed rate calculated by a driving unit.

14. A wire electric-discharge machining apparatus comprising:

a wire electrode;

a machining power supply which applies a pulse-like voltage between the wire electrode and a workpiece to carry out machining on the workpiece;

a driving unit which moves the wire electrode and the workpiece relatively to each other during the machining;

a control unit which calculates a feed rate at which the wire electrode is fed relative to the workpiece and controls the driving unit so that the wire electrode and the workpiece move relatively to each other at the feed rate;

a voltage measurement unit which measures a voltage between the wire electrode and the workpiece while the wire electrode and the workpiece move relatively to each other;

an average voltage calculating unit which calculates an average voltage from voltages measured by the voltage measurement unit at different locations due to the relative movement of the wire electrode and the workpiece;

a relative feed rate determining unit which decides a target relative feed rate between the wire electrode and the workpiece based on the average voltage according to predetermined conditions;

a control parameter setting unit which sets a reference voltage, a shortcircuit reference voltage, and a switching voltage that is set between the shortcircuit reference voltage and the reference voltage based on predetermined conditions; and a control parameter switching unit which switches the target relative feed rate to a positive relative feed rate according to predetermined conditions, when the average voltage exceeds the short circuit reference voltage but is below the switching voltage.

15. A wire electric-discharge machining apparatus comprising:

a wire electrode;

a machining power supply which applies a pulse-like voltage between the wire electrode and a workpiece to carry out machining on the workpiece;

a driving unit which moves the wire electrode and the workpiece relatively to each other during the machining;

a control unit which calculates a feed rate at which the wire electrode is fed relative to the workpiece and controls the driving unit so that the wire electrode and the workpiece move relatively to each other at the feed rate;

an average voltage measurement unit which measures a voltage between the wire electrode and the workpiece while the wire electrode and the workpiece move relatively to each other, and calculates an average voltage from the voltages measured;

a relative feed rate determining unit which decides a target relative feed rate between the wire electrode and the workpiece based on the average voltage according to predetermined conditions;

a control parameter setting unit which sets a reference voltage, a shortcircuit reference voltage, and a switching voltage that is set between the shortcircuit reference voltage and the reference voltage based on predetermined conditions; and a control parameter switching unit which switches the target relative feed rate to a positive relative feed rate according to predetermined conditions, when the average voltage exceeds the short circuit reference voltage but is below the switching voltage.

* * * * *